US010079922B2

(12) United States Patent
Yli-Peltola

(10) Patent No.: US 10,079,922 B2
(45) Date of Patent: Sep. 18, 2018

(54) CONDUCTIVE STRUCTURAL MEMBERS ACTING AS NFC ANTENNA

(71) Applicant: Microsoft Technology Licensing, LLC, Redmond, WA (US)

(72) Inventor: Ilkka Mikael Yli-Peltola, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/068,513

(22) Filed: Mar. 11, 2016

(65) Prior Publication Data

US 2017/0264721 A1 Sep. 14, 2017

(51) Int. Cl.
*H04M 1/02* (2006.01)
*H01Q 5/328* (2015.01)
*H01Q 7/00* (2006.01)
*H01Q 1/24* (2006.01)
*H04B 5/00* (2006.01)
*H04W 4/80* (2018.01)

(52) U.S. Cl.
CPC ............ *H04M 1/026* (2013.01); *H01Q 1/243* (2013.01); *H01Q 5/328* (2015.01); *H01Q 7/00* (2013.01); *H04B 5/0031* (2013.01); *H04W 4/80* (2018.02)

(58) Field of Classification Search
CPC .... H01Q 1/243; H04B 5/0081; H04B 5/0031; H04M 2250/04; H04M 1/0249; H04M 1/026; H04M 1/7253; H04W 4/008
See application file for complete search history.

(56) References Cited

U.S. PATENT DOCUMENTS

| 6,791,500 B2 | 9/2004 | Qi et al. |
| 7,696,928 B2 | 4/2010 | Rowell |
| 7,911,402 B2 | 3/2011 | Rowson et al. |

(Continued)

FOREIGN PATENT DOCUMENTS

| CN | 203466283 U | 3/2014 |
| CN | 104240078 A | 12/2014 |

(Continued)

OTHER PUBLICATIONS

"Small Planar NFC Antenna with Ferrite", Retrieved on: Oct. 9, 2015, 2 pages, Available at: https://www.google.co.in/url?sa=t&rct=j&q=&esrc=s&source=web&cd=1&ved=0CCEQFjAAahUKEwjVmOqPlr_IAhWGJI4KHVSADIU&url=http%3A%2F%2Fproductfinder.pulseeng.com%2Fproducts%2Fdatasheets%2FL158. Pulse Electronics; Published on: Jul. 2013

(Continued)

*Primary Examiner* — Nam Huynh

(57) ABSTRACT

In an embodiment, conductive structural members of a device acting as NFC antenna are described. According to an embodiment, a device comprises: two conductive structural members, each comprising a first electrical end and a second electrical end, a dielectric isolation being configured between the first electrical end of the first structural member and the first electrical end of the second structural member; two NFC antenna feeds, the first feed being electrically coupled with the first electrical end of the first member, the second feed being electrically coupled with the first electrical end of the second member; two grounding components, one each grounding the second electrical end of the conductive structural members; at least one additional antenna feed configured for a frequency other than that of NFC, coupled to either of the two members.

20 Claims, 8 Drawing Sheets

(56) References Cited

U.S. PATENT DOCUMENTS

| | | |
|---|---|---|
| 8,018,386 B2 | 9/2011 | Qi et al. |
| 8,260,199 B2 | 9/2012 | Kowalski |
| 8,744,373 B2 | 6/2014 | Pourseyed |
| 2007/0046369 A1 | 3/2007 | Schober et al. |
| 2010/0277383 A1 | 11/2010 | Autti et al. |
| 2013/0063236 A1 | 3/2013 | Shin et al. |
| 2013/0194136 A1 | 8/2013 | Handro et al. |
| 2014/0015719 A1 | 1/2014 | Ramachandran |
| 2014/0078010 A1 | 3/2014 | Li et al. |
| 2014/0080411 A1 | 3/2014 | Konanur et al. |
| 2014/0139380 A1 | 5/2014 | Ouyang et al. |
| 2014/0347232 A1 | 11/2014 | Mahanfar et al. |
| 2015/0188230 A1 | 7/2015 | Kim et al. |
| 2015/0244061 A1* | 8/2015 | Galeev ............ H01Q 1/50 343/702 |
| 2015/0249485 A1 | 9/2015 | Ouyang et al. |
| 2016/0380337 A1* | 12/2016 | Lee ............ H01Q 1/243 343/702 |

FOREIGN PATENT DOCUMENTS

| | | |
|---|---|---|
| CN | 104466363 A | 3/2015 |
| EP | 3104454 A1 | 12/2016 |
| EP | 3131209 A1 | 2/2017 |
| KR | 101282267 B1 | 7/2013 |

OTHER PUBLICATIONS

Glas, Alexander, "RF and Protection Devices", Published on: Aug. 20, 2015, 16 pages, Available at: http://www.infineon.com/dgdl/Infineon-AN244-AN-v02_00-EN.pdf?fileld=5546d461464245d30146708656126402.

"International Search Report and Written Opinion Issued in PCT Application No. PCT/US2017/020557", dated Jun. 13, 2017, 14 Pages.

* cited by examiner

CONDUCTIVE STRUCTURAL MEMBERS ACTING AS NFC ANTENNA

BACKGROUND

Near field communication, NFC, capability may be present in various devices like smartphones, tablets, phablets etc. NFC may be used for various purposes, including, authentication, access control, monetary transactions, as a bootstrap for data transfer using a faster technology etc. A device with NFC capability may have an NFC antenna to enable communication. Since the NFC standard uses relatively large wavelengths, NFC antenna dimensions may be quite large with respect to other components in a device. With the component miniaturization going on, devices are becoming thinner and thinner. NFC antennas, being large, may become a bottle neck in size reduction, by increasing device thickness. A device may comprise a metallic cover for aesthetic or design reasons. A metallic cover may shield NFC as well as other antennas present in the device. To enable communication, a metal cover of a device may have slits. Further, a metal cover may comprise a ring along the thickness of the device. The ring may have slots to provide space for keys, buttons, connectors and trays for various cards.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, conductive structural members of a device acting as NFC antenna are described. According to an embodiment, a device comprises: two conductive structural members, each comprising a first electrical end and a second electrical end, a dielectric isolation being configured between the first electrical end of the first structural member and the first electrical end of the second structural member; two NFC antenna feeds, the first feed being electrically coupled with the first electrical end of the first member, the second feed being electrically coupled with the first electrical end of the second member; two grounding components, one each grounding the second electrical end of the conductive structural members; at least one additional antenna feed configured for a frequency other than that of NFC, coupled to either of the two members.

An embodiment relates to a device having an elongate conductive structural member and a manufacturing method.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising near field communication, NFC, functionality, for example, laptop-tablet hybrids, tablets, phablets, portable gaming consoles, portable music players, portable NFC readers, portable point of sale payment processors etc.

Although some embodiments may use the phrase "printed wire board, PWB", it is for illustrative purposes only and not intended as a limitation in any way. According to an embodiment, the PWB may include various structures that may mechanically support and/or electrically connect electric and electronic components, for example, Printed Circuit Board, PCB, Printed Circuit Assembly, PCA, Printed Circuit Board Assembly, PCBA, Circuit Card Assembly, CCA, Flexible Printed Circuit, FPC, etc.

According to an embodiment NFC antenna may utilize structural conductive members of the device, which are shared as radiators of other radio systems. According to an embodiment two single-ended antenna loops for NFC may be established. Various radio systems, such as NFC, cellular, Global Positioning System, GPS, Global Navigation Satellite System, GLONASS, Wireless Local Area Network, WLAN, can share the same structural conductive members, which are acting as the antenna radiators, by means of decoupling, because NFC frequency range 13.56 MHz is different from other frequencies, which may typically be higher than 700 MHz. There may not be a need to have a separate NFC antenna and manufacturing costs and space within the device may be saved. A better design of the housing of the device may be achieved, because existing dielectric apertures or slots of the housing, which are found in the design of the cover and housing, may be utilized as isolation for the conductive structural members for establishing the antenna. Device size, particularly thickness may be reduced.

Figure 1:
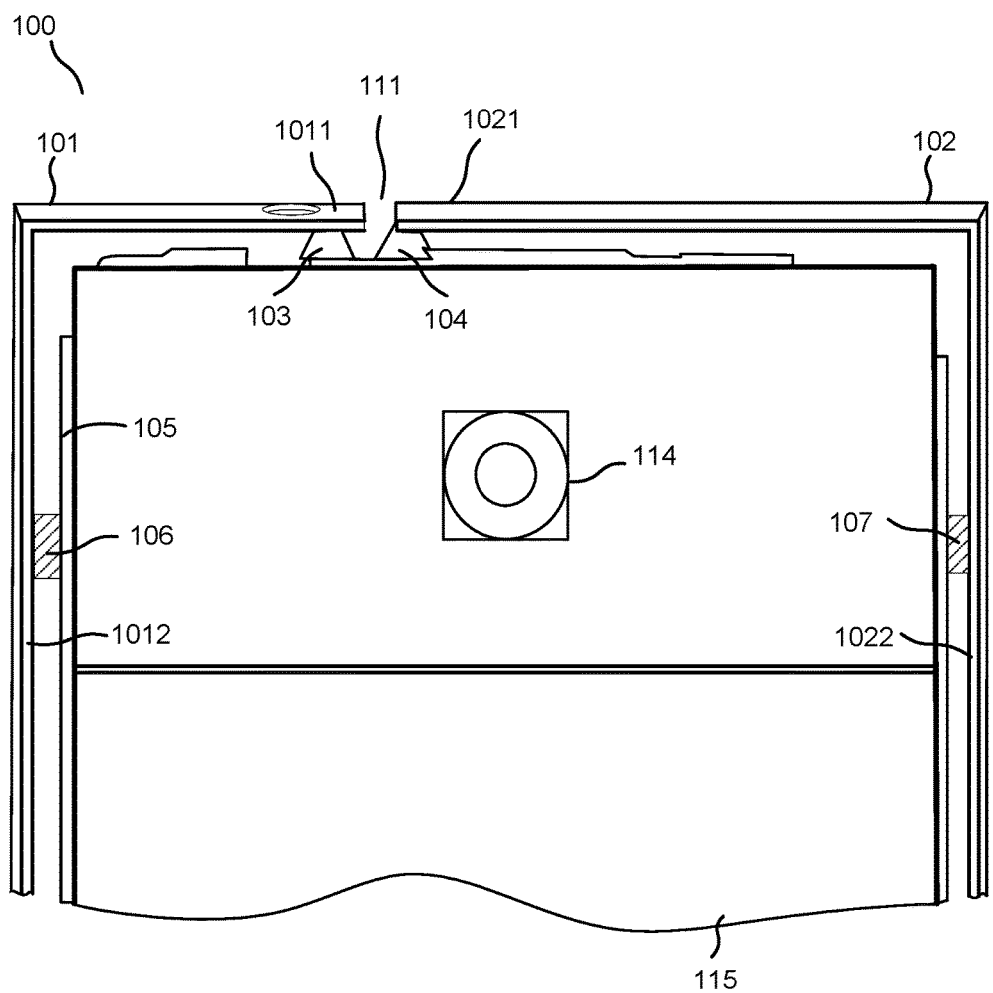
FIG. 1 illustrates a schematic representation of NFC antenna feed coupling with structural members of a device and grounding according to an embodiment.

FIG. 1 is a schematic representation of a posterior view of a device 100 with a back panel 115 displaced to reveal structural conductive members 101, 102, grounding components 106, 107, NFC antenna feeds 103, 104 and margins of a device chassis 105. Device 100 may comprise various other components like camera 114.

Referring to FIG. 1, conductive structural members 101 and 102 may comprise the lateral walls of a device cover. Structural member 101 may have two ends 1011 and 1012. Similarly structural member 102 may have two ends 1021 and 1022. Between the end 1011 of the structural member 101 and the end 1021 of the structural member 102, there may be a gap 111. Gap 111 may be needed for providing access to internal components or for other design considerations. For example the gap 111 may provide access to a connectivity (data transfer) port, a charging port, a sim slot, a memory card slot etc. According to an embodiment, gap 111 may be needed to satisfy antenna design requirements of radio transceivers other than NFC. The gap 111 may act as a dielectric isolation between the conductive members 101, 102 for creating two antenna loops for the NFC antenna. A first NFC antenna feed 103 may be coupled to the end 1011 of the conductive structural member 103 and a second NFC antenna feed 104 may be coupled to the end 1021 of the structural member 102. A grounding component 106 may be configured between the end 1012 of the conductive structural member 101 and a chassis 105 of the device 100. A grounding component 107 may be configured between the end 1022 of the conductive structural member 102 and a chassis 105 of the device 100. According to an embodiment, ends 1011, 1012, 1021 and 1022 of structural members 101 and 102 may be electrical in nature and may not coincide with physical ends of the structural members 101 and 102. According to an embodiment, gap 111 may be a dielectric gap in the form of a non-conductive material. According to an embodiment, grounding components 106 and 107 may be configured between ends 1012, 1022 and a PWB (not illustrated in FIG. 1).

Referring to FIG. 1, antenna feeds 103 and 104 may be coupled to the conductive structural members 101 and 102 such that the current excited in the structural member 102 have a phase shift of 180 degrees with respect to the current excited in the structural member 101. Grounding components 106 and 107 may be configured such that the currents so excited traverse a complete path to the ground. This may result in the currents generating magnetic fields which may reinforce each other. According to an embodiment, the feed 104 may excite a current in the structural member 102 such that the current direction is from the feed 104 to the end 1021 and from the end 1021 toward the end 1022 to the grounding component 107. The feed 103 may excite a current in the structural member 101 such that the current direction is from the end 1011 to the feed 103 and from the feed 103 towards the end 1012 to the grounding component 106. From the grounding components 106, 107 the current travels back to the feed points 103, 104 respectively. According to an embodiment, the path traversed by the currents may be substantially annular or circling a path. Consequently, two current loops may be established. According to an embodiment, currents of the two loops may flow in the same angular direction boosting the total magnetic field. The current direction may be, for example, clockwise or counter-clockwise in both loops. This may be achieved by 180 degree phase shift for the currents emanating from the feeds with respect to each other.

According to an embodiment, a separate antenna for NFC operation may not be needed, because conductive structural members 101, 102 are acting as NFC antenna. Consequently, a reduction of the device thickness may be achieved, because there is no need to have a specific NFC antenna. According to an embodiment, large slits on the back panel 115 for NFC operation may be eliminated. Gap 111 may be used as isolation for creating the NFC antennas, and establishing the two current paths.

According to an embodiment, a conductive structural member may be any component of a device 100, which exhibits electrical conductivity and which is not configured exclusively for NFC functionality. The other functions of a conductive structural may, non-exclusively, include: providing mechanical strength, providing electro-magnetic shielding, acting as a component of the device cover etc. The conductive structural members may be a portion of a body, a portion of a chassis, a portion of housing, or a portion of cover of the device, etc.

Figure 2:
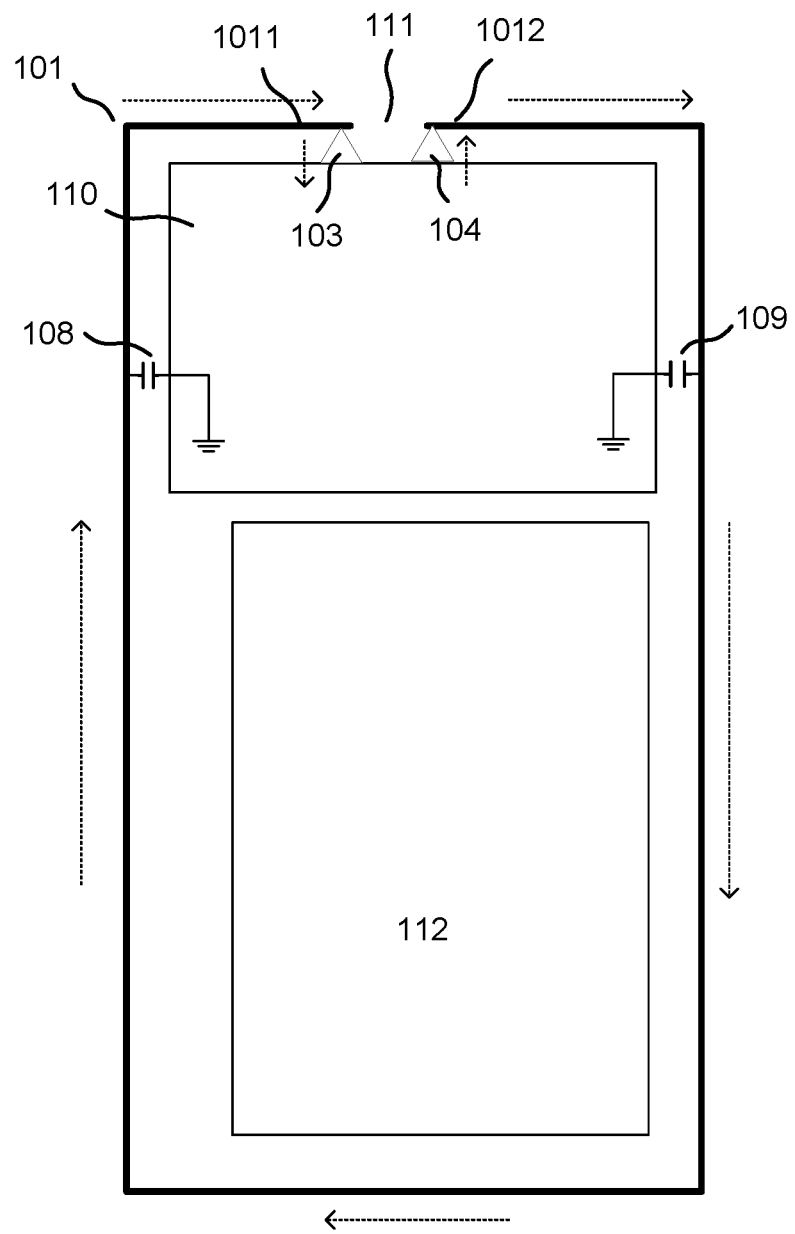
FIG. 2 illustrates a schematic representation of a device comprising NFC feeds coupled to a circum-enveloping structural member according to an embodiment.

FIG. 2 illustrates a schematic cross-section of a device 100, comprising a circum-enveloping conductive structural member 101, NFC antenna feeds 103, 104 a PWB 110, grounding components 108, 109 and a battery 112, according to an embodiment. According to an embodiment, circum-enveloping conductive structural member 101 may be a metal ring comprising the lateral walls of device 100. The structural member 101 may have two ends 1011 and 1012 separated by a gap 111. Gap 111 may be needed for various design considerations including access to connectivity and/or charging ports. A first NFC antenna feed 103 may be coupled with end 1011 of the conductive structural member 101 while a second NFC antenna feed 104 may be coupled with end 1012 of the conductive structural member 101. Grounding components 108 and 109 may be configured between the structural member 101 and PWB 110 or device chassis (not shown in FIG. 2). According to an embodiment, additional antennas (not shown in FIG. 1) corresponding to frequencies other than NFC may be coupled to either structural member end 1011 or 1012 or both, without interfering with NFC operation. According to an embodiment, grounding components 108, 109 may selectively ground frequencies other than those corresponding to NFC, for example those corresponding to cellular communication, Wi-Fi, Bluetooth, and GPS etc. The grounding 108, 109 conductors may be configured at strategic locations such that the operation of NFC is not affected by operation of other transceivers and vice versa.

Referring to FIG. 2, current induced by feeds 103, 104 may traverse the entire path formed by structural member 101, as exemplarily illustrated by dotted arrows, forming an NFC antenna with an aperture comparable to device 100 dimensions. According to an embodiment, grounding components 108 and 109 may each comprise a capacitive component. The capacitance of capacitive components may be selected such that at frequencies higher than those corresponding to NFC they behave as short circuits, while at frequencies corresponding to NFC, they behave as open circuit. Such a configuration may ensure that currents corresponding to NFC traverse the whole length of conductive structural member 101, forming an NFC antenna with aperture substantially equal to size of the device 100. According to an embodiment, grounding components 108, 109 may also provide mechanical support or strength. According to an embodiment, using structural member 101 as NFC antenna may eliminate the need for a separate NFC antenna. According to an embodiment, device thickness may be reduced.

Figure 3:
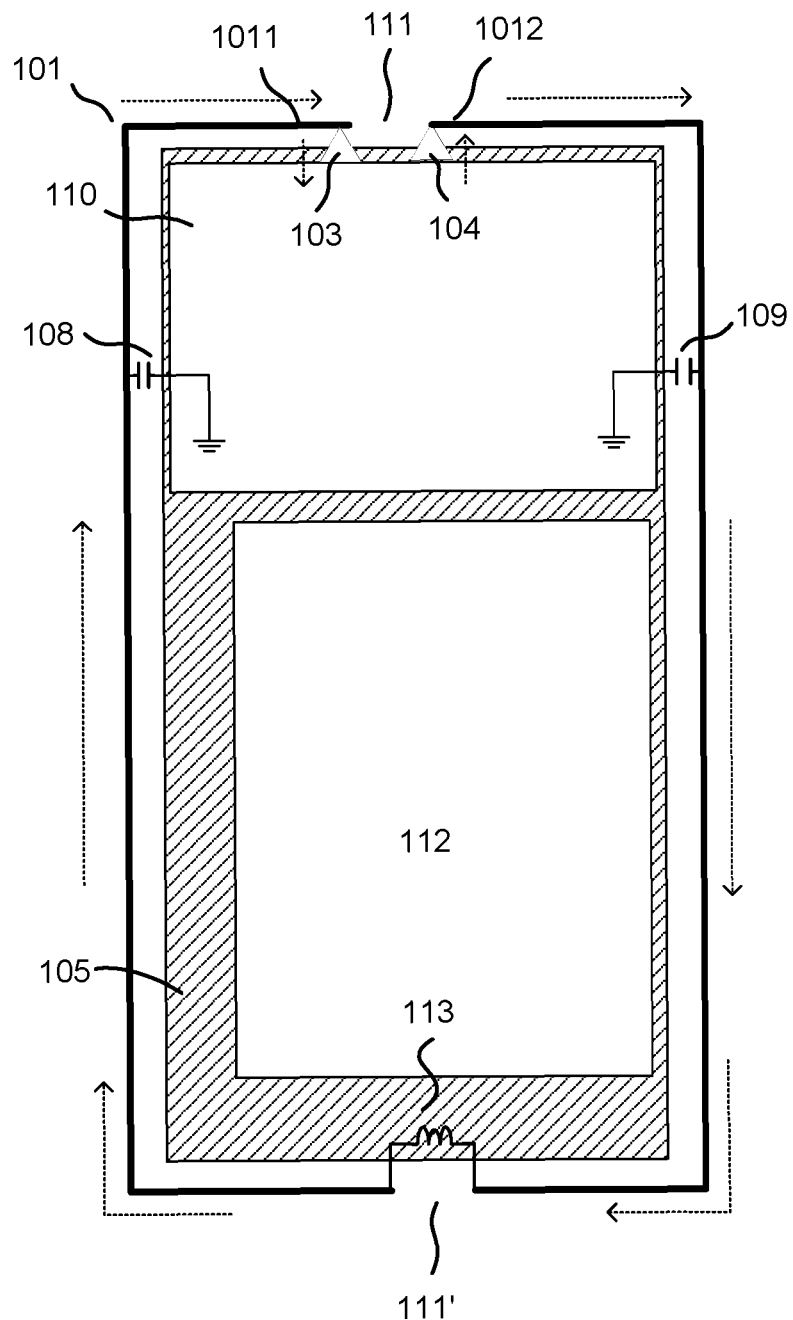
FIG. 3 illustrates a schematic representation of a device comprising NFC feeds coupled to a circum-enveloping structural member having an additional dielectric gap, according to an embodiment.

FIG. 3 illustrates a schematic cross-section of a device 100, comprising a circum-enveloping conductive structural member 101, NFC antenna feeds 103, 104, a PWB 110, grounding components 108, 109, a conductive component 113, and a battery 112, according to an embodiment. According to an embodiment, circum-enveloping conductive structural member 101 may be a metal ring comprising the lateral walls of device 100. The structural member 101 may have two ends 1011 and 1012 separated by a gap 111. Gap 111 may be needed for various design considerations. NFC feeds 103 and 104 may be coupled with ends 1011 and 1012 respectively. At least one more gap 111' may be configured in the structural member 101 for various design considerations. The design considerations for gaps 111 and 111' may include allowing access to connectivity and/or charging ports, slots for memory or Subscriber Identity Module, SIM cards and openings for audio jacks etc. The gap 111' may be bridged by a conductor 113. According to an embodiment, the conductor 113 may be an inductor configured to block currents corresponding to frequencies higher than those of NFC. Grounding components 108 and 109 may be configured between the structural member 101 and PWB 110 or device chassis 105. The grounding components 108 and 109 may be configured to ground currents corresponding to frequencies other than NFC. The grounding components 108, 109 may be implemented, for example, by using suitable capacitance capacitors. Current induced by NFC feeds 103, 104 may traverse the entire path formed by structural member 101 and conductive component 113, as exemplarily illustrated by dotted arrows, forming an NFC antenna with an aperture comparable to device 100 dimensions. According to an embodiment, conductor 113 may be configured on the chassis 105 of the device. According to an embodiment, conductor 113 may be configured on a PWB 110, if the PWB 110 is situated in proximity of gap 111'. According to an embodiment, the conductor 113 may be a flexible conductor, configured such that the gap 111' is not physically blocked.

Figure 4:
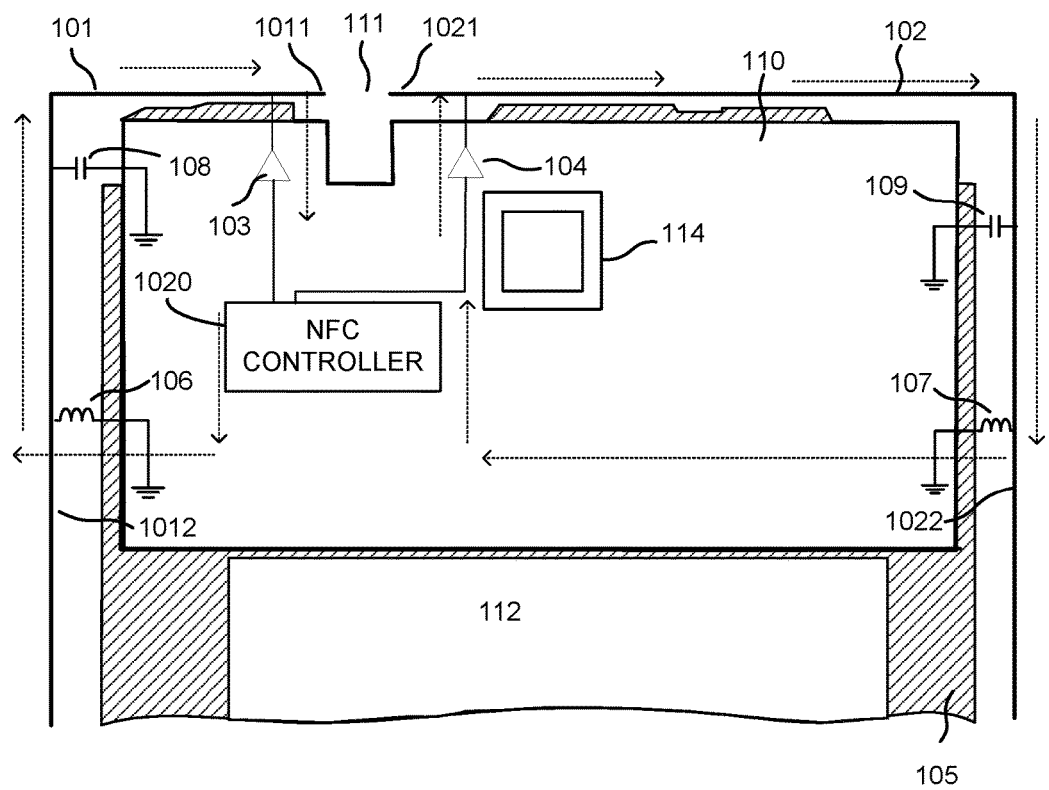
FIG. 4 illustrates NFC antenna feed coupling and selective grounding according to an embodiment.

FIG. 4 illustrates a sectional view of device 100 comprising two conductive structural members 101, 102, grounding components 106, 107, 108, 109, NFC antenna feeds 103, 104, an NFC controller 1020, a camera 114 configured on a PWB 110. The PWB may be configured on a chassis 105. The PWB 110 may be configured such that a battery 112 may be positioned below it. NFC controller 1020 may control the general operation of NFC and also send to or receive signals from NFC feeds 103, and 104. Further, various other components like a processor, memory, cellular radio baseband chips (not shown in FIG. 4) may be configured on PWB 110.

Referring to FIG. 4, the structural member 101 may have two ends, 1011 and 1012. A first NFC antenna feed 103 may be coupled with the end 1011 while the end 1012 may be grounded by the grounding component 106. The structural member 102 may have two ends, 1021 and 1022. There may be a gap 111 between the ends 1011 and 1021. A second NFC antenna feed 104 may be coupled with the end 1021 while the end 1022 may be grounded by a grounding component 107. Grounding components 106 and 107 may be configured to ground frequencies corresponding to NFC only. According to an embodiment, grounding components 106 and 107 may each comprise an inductive component, whose inductance is selected such that at frequencies higher than those corresponding to NFC, it acts as an open circuit. Grounding components 108,109 may selectively ground frequencies higher than those corresponding to NFC, for example frequencies corresponding to cellular radios, Bluetooth, GPS, Wi-Fi, etc. Grounding components 108, 109 may each comprise a capacitive component, whose capacitance may be selected such that it acts as a short circuit for frequencies higher than those corresponding to NFC. A grounding component 108, 109 may be configured between structural members 101, 102 and PWB 110 or chassis 105 at a suitable location to enable operation of NFC as well as the other radios without substantial interference. Any number of the grounding components 106, 107, 108 and 109 may provide mechanical strength as well. According to an embodiment, any number of grounding components 106, 107, 108, 109 may be structural parts of one or more of: the conductive structural members 101, 102, PWB 110 or device chassis 105. According to an embodiment, the ends 1011, 1012 of the structural member 101; the ends 1021 and 1022 of the structural member 102 and the gap 111 between ends 1011 and 1021 need not be physical in nature. According to an embodiment, structural members 101 and 102 may be physically joined together beyond the grounding components 106 and 107, forming a circum-enveloping lateral wall around the device. According to an embodiment, structural members 101 and 102 may be joined physically to form a circum-enveloping lateral wall, eliminating the need for grounding components 106 and 107, and providing a longer annular path for current corresponding to NFC feeds.

Referring to FIG. 4, grounding components 106 and 107 may be configured such that the currents excited by NFC antenna feeds 103 and 104 in structural members 101 and 102 respectively follow a substantially annular path. The direction of currents excited by feeds 103, 104 may be such that the magnetic fields so generated reinforce each other. For example, the currents flows in the opposite directions in the feeds 103 and 104 as illustrated by dotted arrows.

Figure 5:
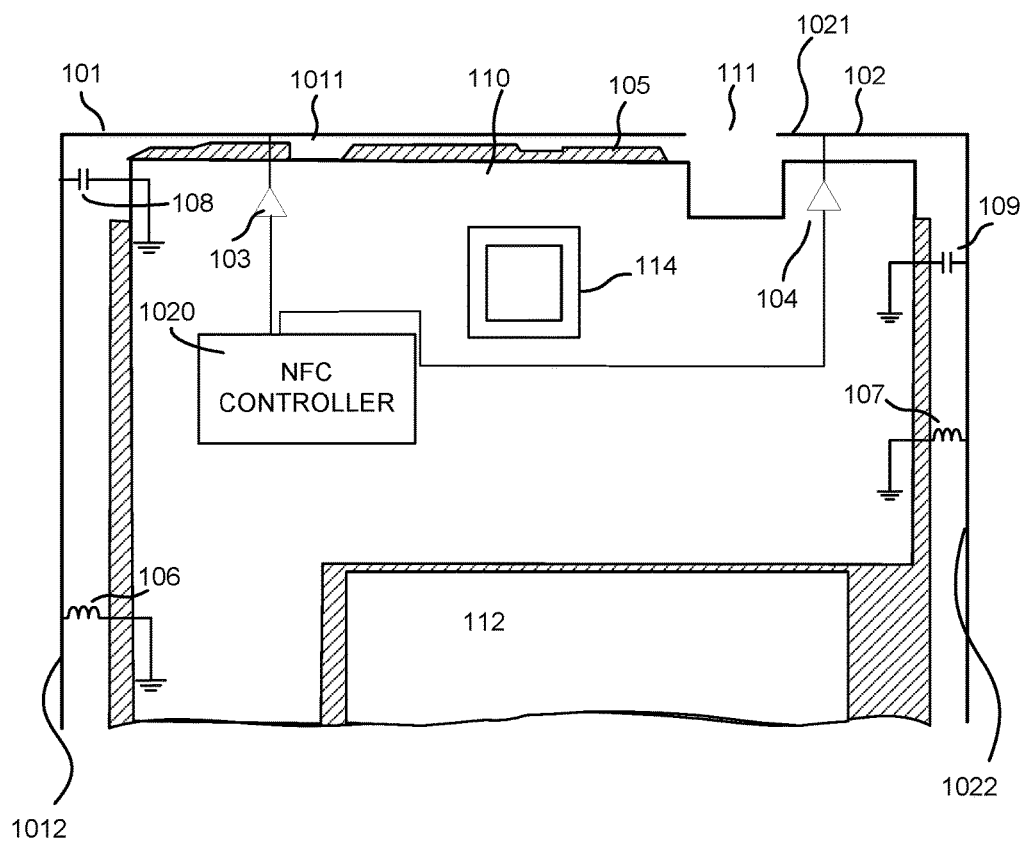
FIG. 5 illustrates NFC antenna feed coupling and selective grounding on an L shaped PCB, according to an embodiment.

FIG. 5 illustrates a sectional view of a device 100 comprising two conductive structural members 101, 102, grounding components 106, 107, 108, 109, NFC antenna feeds 103, 104, an NFC controller 1020, a camera 114 configured on a PWB 110. The PWB may be configured on a chassis 105. The PWB 110 may be inverted L shaped, configured such that a battery 112 may be positioned in the space under the inverted L. NFC controller 1020 may control the general operation of NFC and also send to or receive signals from NFC feeds 103, and 104. Further various other components like processors, memory, cellular radio baseband chips (not shown in FIG. 5) may be configured on the PWB 110.

Referring to FIG. 5, structural member 101 may have two ends, 1011 and 1012. A first NFC antenna feed 103 may be coupled with the end 1011 while the end 1012 may be grounded by the grounding component 106. The structural member 102 may have two ends, 1021 and 1022. There may be a gap 111 between ends 1011 and 1021. A second NFC antenna feed 104 may be coupled with end 1021 while the end 1022 may be grounded by a grounding component 107. Grounding components 106 and 107 may be configured to ground frequencies corresponding to NFC only. According to an embodiment, grounding components 106 and 107 may each comprise an inductive component whose inductance is selected such that at frequencies higher than those corresponding to NFC, it acts as an open circuit. Grounding components 108,109 may selectively ground frequencies higher than those corresponding to NFC, for example frequencies corresponding to cellular radio, Bluetooth, GPS, Wi-Fi etc. Grounding components 108, 109 may each comprise a capacitive component, whose capacitance may be selected such that it acts as a short circuit for frequencies higher than those corresponding to NFC. Grounding components 108,109 may be configured between structural members 101, 102 and PWB 110 or chassis 105 at suitable locations to enable operation of NFC without substantial interference. Any number of the grounding components 106, 107, 108 and 109 may provide mechanical strength as well. According to an embodiment, any number of grounding components 106, 107, 108, 109 may be structural parts of one or more of: the conductive structural members 101, 102, PWB 110 or device chassis 105. According to an embodiment, ends 1011, 1012, of structural member 101; ends 1021 and 1022 of structural member 102 and the gap 111 between ends 1011 and 1021 need not be physical in nature. According to an embodiment, structural members 101 and 102 may be physically joined together beyond the grounding components 106 and 107, forming a circum-enveloping lateral wall around the device. According to an embodiment, structural members 101 and 102 may be joined physically to form a circum-enveloping lateral wall, eliminating the need for grounding components 106 and 107, and providing a bigger annular path for current corresponding to NFC feeds.

Referring to FIG. 5, grounding components 106 and 107 may be configured such that the currents excited by NFC antenna feeds 103 and 104 in structural members 101 and 102 respectively follow a substantially annular path. The direction of currents excited by feeds 103, 104 may be such that the magnetic fields so generated reinforce each other, providing an NFC antenna with an aperture substantially of the same size as enclosed by the structural members 101 and 102.

Figure 6:
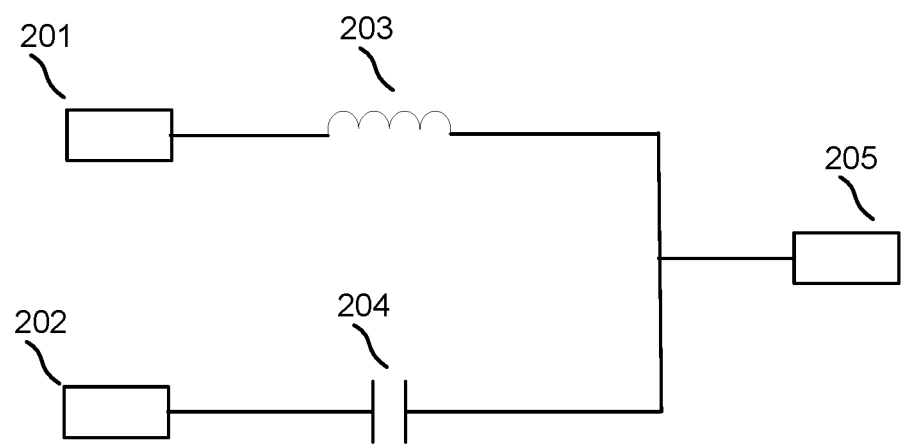
FIG. 6 illustrates a circuit for selective coupling of multiple antennas to a radiator, according to an embodiment.

FIG. 6 illustrates a antenna feed mechanism supporting multiple antenna feeds according to an embodiment, comprising an NFC port 201, an RF port 202, an inductor 203, a capacitor 204, and a radiator 205. NFC port may be configured for NFC operation. RF port 202 may be configured for operation of one of: cellular radios, Wi-Fi, Bluetooth, GPS, or Global Navigation Satellite System (GLONASS), etc. NFC port may be connected to radiator 205 via an inductor 203, while RF port may be coupled to radiator 205 via a capacitor 204. The inductance of the inductor 203 may be selected such that it acts as a short circuit at NFC frequencies but as an open circuit at frequencies corresponding to cellular radios, Wi-Fi, Bluetooth, GPS, GLONASS etc. Capacitance of the capacitor 204 may be selected such that it acts as an open circuit at the low frequencies corresponding to NFC, but acts as a short circuit at frequencies corresponding to any of cellular radios, Wi-Fi, Bluetooth, GPS, and GLONASS etc. According to an embodiment, the radiator 205 may be one or more of the conductive structural members 101 and 102 of the embodiments discussed herein. Coupling of antenna feeds 103, 104 to structural members 101, 103 may be implemented as discussed herein in any of the embodiments.

Figure 7:
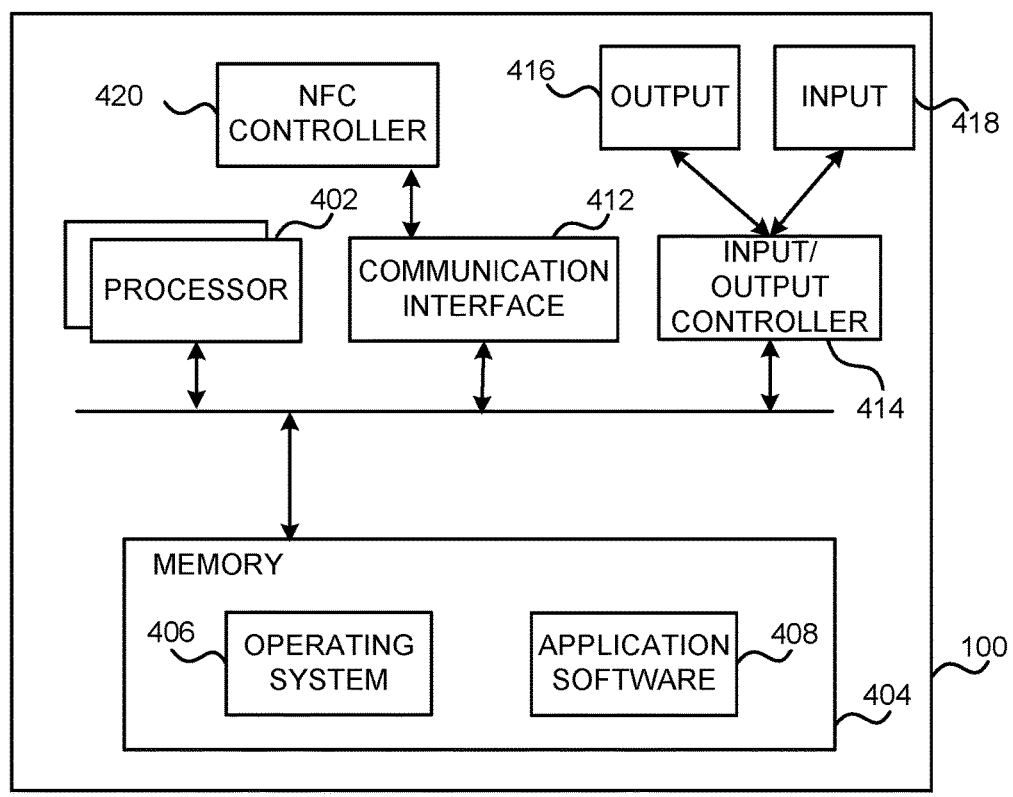
FIG. 7 illustrates a computing device comprising an NFC antenna according to an embodiment.

FIG. 7 illustrates an example of components of a device 100 which may be implemented as a form of a computing and/or electronic device. The device 100 comprises one or more processors 402 which may be microprocessors, controllers or any other suitable type of processors for processing computer executable instructions to control the operation of the apparatus 100. Platform software comprising an operating system 406 or any other suitable platform software may be provided on the apparatus to enable application software 408 to be executed on the device.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the computer storage medium (the memory 404) is shown within the device 100, it will be appreciated, by a person skilled in the art, that the storage may be distributed or located remotely and accessed via a network or other communication link (for example using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, for example a locally connected printing device. The device 100 may comprise an NFC controller 420, separate from and connected to or integral to and contained within the communication interface 412. According to an embodiment, the device 100 for example as shown in FIGS. 1 to 5, may be established with the features of FIG. 7, for example the operating system 406 and the application software 408 working jointly, and executed by the processor 402.

Figure 8:
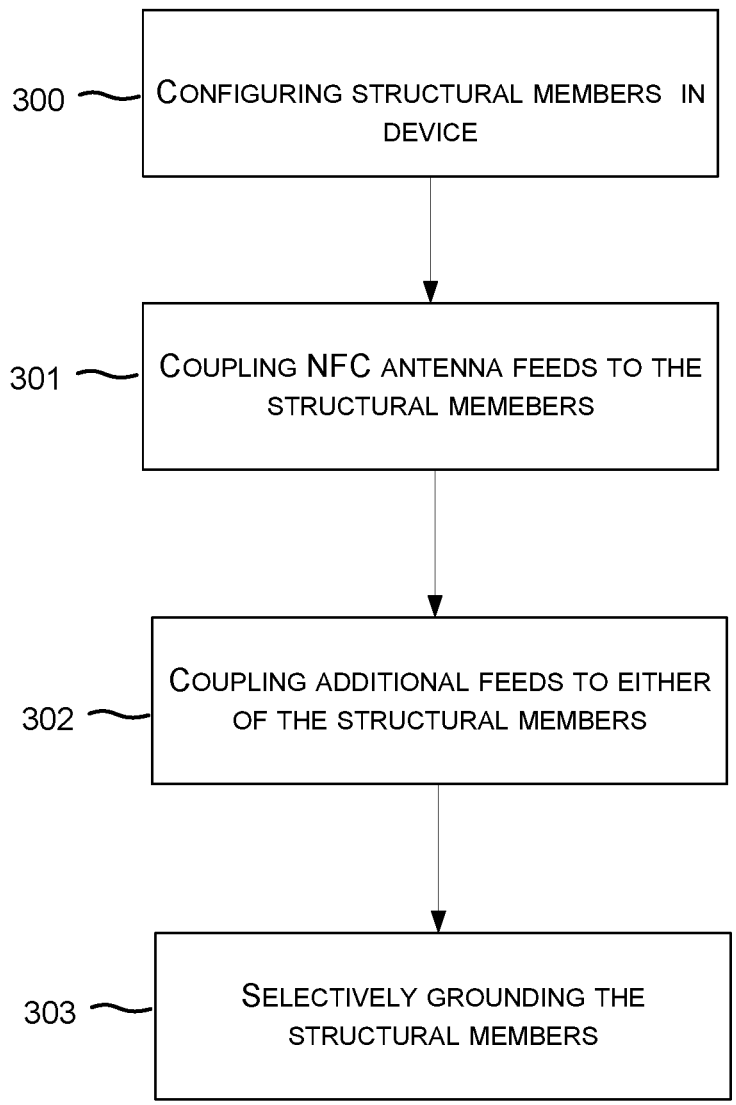
FIG. 8 illustrates a schematic flow chart of a method of implementing an NFC antenna in a device in accordance with an embodiment.

FIG. 8 illustrates, as a schematic flow chart, a method in accordance with an embodiment. Referring to FIG. 7, according to an embodiment the process comprises operations 300, 301, 302 and 303. According to an embodiment, the process of FIG. 8 may be compiled into the program code 406,408.

Operation 300 may include configuring two structural members 101,102 in a device 100 or around the edges of a PWB 110 comprising the device 100. Each structural member 101,102 comprising two ends 1011,1012,1021,1022, while the PWB 110 comprising two NFC antenna feeds 103,104 and at least one additional antenna feed not configured for NFC.

Operation 301 may include coupling each NFC antenna feed 103,104, to an end 1011, 1021 of the structural members 101, 102. Those ends 1011, 1021 being selected which are proximal to each other but have a dielectric gap 111 in between them.

Operation 302 may include coupling the additional feeds to either of the structural members 101, 102.

Operation 303 may include selectively grounding the structural members 101, 102, such that the current corresponding to NFC antenna feeds 103, 104, follows a substantially annular path. According to an embodiment, selective grounding may include grounding frequencies corresponding to NFC.

According to an embodiment, the second ends 1012, 1022 of the structural members 101, 102 may be electrically connected to each other. According to an embodiment, the second ends 1012, 1022 of the structural members 101, 102 may be physically connected to each other. According to an embodiment, the second ends 1012, 1022 of the structural members 101, 102 may be physically as well as electrically connected to each other. According to an embodiment, selective grounding may include selectively grounding currents corresponding to frequencies higher than those used in NFC.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for conductive and non-conductive structural members of the device acting as NFC antenna and an antenna for other than NFC radio systems. For example, the elements illustrated in FIG. 1 to FIG. 8 constitute exemplary means for two conductive structural members, means for first and second electrical end, dielectric isolation means, NFC antenna feeding means, grounding means, connecting means, feeding means for a frequency other than that of NFC.

According to an embodiment, a device comprising: two conductive structural members, each comprising a first electrical end and a second electrical end, a dielectric isolation being configured between the first electrical end of the first structural member and the first electrical end of the second structural member; two Near Field Communication, NFC, antenna feeds, the first feed being electrically coupled with the first electrical end of the first member, the second feed being electrically coupled with the first electrical end of the second member; two grounding components, one each grounding the second electrical end of the conductive structural members; and at least one additional antenna feed configured for a frequency other than that of NFC, coupled to either of the two members.

Alternatively or in addition to the above, the conductive structural members comprise a device cover.

Alternatively or in addition to the above, the conductive structural members are configured around the edges of the device.

Alternatively or in addition to the above, the antenna feeds are configured to feed currents to the structural members in opposite directions.

Alternatively or in addition to the above, the grounding components are positioned such that a substantially annular path is provided to the current in the structural members.

Alternatively or in addition to the above, the grounding components are configured between the structural members and at least one of a chassis comprising the device and a printed circuit board comprising the device.

Alternatively or in addition to the above, the grounding components are configured to selectively ground currents corresponding to the NFC feeds.

Alternatively or in addition to the above, the grounding components comprise an inductive component.

Alternatively or in addition to the above, the grounding components are configured to provide mechanical support to the structural members.

Alternatively or in addition to the above, the grounding components are structural extensions of the structural members.

Alternatively or in addition to the above, the NFC antenna feeds are coupled to the structural members via inductors.

Alternatively or in addition to the above, the at least one additional antenna feed is coupled to one the structural members via a capacitor.

Alternatively or in addition to the above, further comprising at least a third grounding component, configured to selectively ground currents corresponding to the at least one additional antenna feed.

Alternatively or in addition to the above, the at least one additional antenna feed is configured for a frequency range suitable for at least one of: Wireless Local Area Network, FM-Radio, Long Term Evolution Wideband Low Band, Global Navigation Satellite System, Global Positioning System, BeiDou Satellite Navigation System, or a non-cellular wireless system.

Alternatively or in addition to the above, the two structural members are electrically and/or physically joined to each other beyond their second electrical ends and the grounding components are configured to ground currents corresponding to frequencies higher than those corresponding to NFC.

According to an embodiment, a device comprising: an elongate conductive structural member, having two electrical ends in proximity of one another, a dielectric isolation between the two electrical ends; two NFC antenna feeds, the first feed electrically coupled with the first end of the member, the second feed electrically coupled with the second end of the member; and at least one additional antenna feed, configured to a frequency other than that of NFC, coupled to the member.

Alternatively or in addition to the above, further comprising two inductive grounding components configured to selectively ground the conductive structural member with a printed circuit board such that the current corresponding to the NFC feeds follows a substantially annular path.

Alternatively or in addition to the above, further comprising a capacitive grounding component configured to selectively ground currents corresponding to the at least one additional antenna feed.

According to an embodiment, a method comprising; placing two conductive structural members each comprising two electrical ends in a device or around the edges of a printed wire board comprising the device, the printed wire board comprising; two NFC antenna feeds; and at least one antenna feed calibrated to a frequency other than that of NFC; coupling each NFC antenna feed to a first end of the two structural members; coupling the at least one additional antenna feed to either of the two structural members; and selectively grounding the second electrical ends of the structural members such that the current corresponding to NFC antenna feeds follows a substantially annular path.

Alternatively or in addition to the above, the second ends of the two structural members are connected to each other either electrically, physically or both electrically and physically.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
   two conductive structural members, each comprising a first electrical end and a second electrical end, a dielectric isolation being configured between the first electrical end of the first structural member and the first electrical end of the second structural member;
   two near field communication (NFC) antenna feeds, the first feed being electrically coupled with the first electrical end of the first conductive structural member, the second feed being electrically coupled with the first electrical end of the second conductive structural member;
   two grounding components, one grounding the first conductive structural member using a first inductor and one grounding the second conductive structural member using a second inductor, wherein each of the two grounding components is configured to selectively ground currents corresponding to frequencies other than frequencies corresponding to NFC;
   a third inductor being configured between the second electrical end of the first conductive structural member and the second electrical end of the second conductive structural member, the third inductor configured to block currents corresponding to frequencies higher than frequencies corresponding to NFC; and
   at least one additional antenna feed configured for a frequency other than that of NFC, coupled to either of the two conductive structural members.

2. The device of claim 1, wherein the conductive structural members comprise a device cover.

3. The device of claim 2, wherein the conductive structural members are configured around the edges of the device.

4. The device of claim 1, wherein the antenna feeds are configured to feed currents to the conductive structural members in opposite directions.

5. The device of claim 1, the grounding components are positioned such that a substantially annular path is provided to the current in the conductive structural members.

6. The device of claim 1, wherein the grounding components are configured between the conductive structural members and at least one of a chassis comprising the device and a printed circuit board comprising the device.

7. The device of claim 1, wherein the third inductor is configured on a printed wire board.

8. The device of claim 1, wherein the grounding components are configured between the conductive structural members and a chassis at suitable locations to enable operation of NFC without substantial interference.

9. The device of claim 1, wherein the grounding components are structural extensions of the conductive structural members.

10. The device of claim 1, wherein the NFC antenna feeds are coupled to the conductive structural members via inductors.

11. The device of claim 1, wherein the at least one additional antenna feed is coupled to one of the conductive structural members via a capacitor.

12. The device of claim 1, further comprising at least a third grounding component, configured to selectively ground currents corresponding to the at least one additional antenna feed.

13. The device of claim 1, wherein the at least one additional antenna feed is configured for a frequency range suitable for at least one of: Wireless Local Area Network, FM-Radio, Long Term Evolution Wideband Low Band, Global Navigation Satellite System, Global Positioning System, BeiDou Satellite Navigation System, or a non-cellular wireless system.

14. The device of claim 1, wherein the two conductive structural members are electrically, or physically, or both, joined to each other beyond their second electrical ends.

15. The device of claim 1, wherein the third inductor is a flexible inductor.

16. A device comprising:
   an elongate conductive structural member, having two electrical ends in proximity of one another, a dielectric isolation between the two electrical ends;
   two near field communication (NFC) antenna feeds, the first feed electrically coupled with the first end of the member, the second feed electrically coupled with the second end of the member;
   two grounding components, one each grounding each end of the conductive structural member using an inductor, wherein each of the two grounding components is configured to selectively ground currents corresponding to frequencies other than frequencies corresponding to NFC;
   the elongated conductive structural member comprising a further inductor configured to block currents corresponding to frequencies higher than frequencies corresponding to NFC; and
   at least one additional antenna feed, configured to a frequency other than that of NFC, coupled to the member.

17. The device of claim 16, wherein the two grounding components are configured to selectively ground the conductive structural member with a printed circuit board such that the current corresponding to the NFC feeds follows a substantially annular path.

18. The device of claim 16, further comprising a capacitive grounding component configured to selectively ground currents corresponding to the at least one additional antenna feed.

19. A method comprising;
   placing two conductive structural members each comprising two electrical ends in a device or around the edges of a printed wire board comprising the device, the printed wire board comprising;
      two near field communication (NFC) antenna feeds; and
      at least one antenna feed calibrated to a frequency other than that of NFC;
   coupling each NFC antenna feed to a first end of the two conductive structural members;
      two grounding components, one grounding a first conductive structural member using a first inductor and one grounding a second conductive structural member using a second inductor, wherein each of the two grounding components is configured to selectively ground currents corresponding to frequencies other than frequencies corresponding to NFC;
   a third inductor being configured between a second electrical end of the first conductive structural member and a second electrical end of the second conductive structural member, the third inductor configured to block currents corresponding to frequencies higher than those of NFC;
   coupling the at least one additional antenna feed to either of the two conductive structural members; and
   selectively grounding the second ends of the two conductive structural members such that the current corresponding to NFC antenna feeds follows a substantially annular path, and such that currents corresponding to frequencies higher than frequencies corresponding to NFC are grounded.

20. The method of claim 19, wherein the second ends of the two conductive structural members are connected to each other either electrically, physically or both electrically and physically.

* * * * *